United States Patent [19]

Yatsu et al.

[11] Patent Number: 4,874,647
[45] Date of Patent: Oct. 17, 1989

[54] POLYESTER COMPOSITION, MOLDED POLYESTER LAMINATE AND USE THEREOF

[75] Inventors: Tadao Yatsu; Yoshinori Akana, both of Iwakuni, Japan

[73] Assignee: Mitsui Petrochemical Industries, Inc., Tokyo, Japan

[21] Appl. No.: 277,524

[22] Filed: Nov. 28, 1988

Related U.S. Application Data

[63] Continuation of Ser. No. 127,316, Dec. 2, 1987, abandoned.

[30] Foreign Application Priority Data

Dec. 4, 1986 [JP] Japan ............................. 61-287776
Dec. 9, 1986 [JP] Japan ............................. 61-291489

[51] Int. Cl.$^4$ .................. B65D 1/00; B32B 27/08; B32B 27/36
[52] U.S. Cl. .................. 428/35.7; 525/439; 525/466; 428/412; 428/480; 428/35.2; 428/910
[58] Field of Search ............. 525/439, 466; 428/35, 428/412, 480

[56] References Cited

U.S. PATENT DOCUMENTS

| | | | |
|---|---|---|---|
| 4,367,317 | 1/1983 | Fox et al. | 565/439 |
| 4,461,877 | 7/1984 | Fox et al. | 525/439 |
| 4,619,976 | 10/1986 | Morris et al. | 525/439 |

*Primary Examiner*—Theodore E. Pertilla
*Attorney, Agent, or Firm*—Armstrong, Nikaido, Marmelstein, Kubovcik & Murray

[57] ABSTRACT

A transparent, heat resistant polyester composition having improved mechanical strength is provided, which comprises (A) 20 to 80% by weight of a polyalkylene terephthalate predominantly comprising ethylene terephthalate and having an intrinsic viscosity of from 0.6 to 1.2 dl/g, and (B) 20 to 80% by weight of a bisphenol-A polycarbonate having an intrinsic viscosity of from 0.6 to 1.2 dl/g, the composition having an intrinsic viscosity of from 0.6 to 1.2 dl/g and a single glass transition temperature of from 80° to 130° C. A polyester laminate may be molded as comprising a layer of the polyester composition and a layer of alkylene terephthalate. The molded polyester laminate can take any form including films and containers.

4 Claims, No Drawings

POLYESTER COMPOSITION, MOLDED POLYESTER LAMINATE AND USE THEREOF

This application is a continuation of application Ser. No. 127,316 filed Dec. 2, 1987, now abandoned.

BACKGROUND OF THE INVENTION

This invention relates to a polyester composition having improved transparency and heat resistance. More particularly, it relates to a polyester composition comprising a polyalkylene terephthalate and a polycarbonate in which the glass transition temperature as measured by a differential scanning calorimeter (DSC) exhibits a single transition and from which a molded article having improved transparency and heat resistance and increased mechanical strength can be produced. It also pertains to a transparent molded polyester laminate having improved heat resistance as well as improved mechanical properties including impact resistance. More particularly, it pertains to a transparent molded polyester laminate comprising a layer formed of polyalkylene terephthalate and another layer of a polyester composition of polyalkylene terephthalate and polycarbonate, having improved heat resistance as well as improved mechanical properties including impact resistance.

Resin compositions comprising a polyester such as polyethylene terephthalate and a polycarbonate are well known in the art from the literature and patent publications including Japanese Patent Application Kokai Nos. 52-51445, 53-51248, 54-18375, 55-145751, and 58-500614, Japanese Patent Publication Nos. 36-14035, 57-16137, and 58-18391, J. W. Barlow et al, Journal of Applied Polymer Science, Vol. 23, 85-99 (1979), and Hi Hui Wang et al, Makromoleculre Chemie Rapid Communications, Vol. 7, 255-259 (1986). In these publications, attempts were made to produce a highly transparent composition from polyester and polycarbonate. Japanese Patent Application Kokai Nos. 52-51445 and 53-51248 and Japanese Patent Publication No. 58-18391, however, describe that only compositions comprising a major proportion of polyester or polycarbonate are highly transparent. In either of these publications, it is described that no composition with high transparency is available when the proportions of polyester and polycarbonate blended approach to be equal. The polyester base compositions described in these publications have excellent chemical resistance despite transparency, but are poor in such properties as heat resistance and impact resistance. These compositions also suffer from the likelihood of sink marks and warping occurring on the appearance of parts molded therefrom. The polycarbonate base compositions have excellent heat resistance despite transparency, but are poor in such properties as chemical resistance, stress crack resistance, and melt flow. We have made follow-up tests to find that when a polyester and a polycarbonate are blended in a proportion of from 80:20 to 20:80 by weight according to the methods proposed in the above-cited publications, the resulting resin compositions do not fulfil a desired profile of melt flow, transparency, heat resistance, mechanical strength and chemical resistance.

Hi Hui Wang et al, Makromoleculre Chemie Rapid Communications, Vol. 7, 255-259 (1986) incorporated herein by reference report that approximately equal proportions of polyester and polycarbonate give a transparent resin composition having a single glass transition temperature. The resin compositions obtained according to the teaching of this literature, however, cannot be used as the molding material from which food containers and medical equipment parts are molded because they have a low molecular weight and hence, a low mechanical strength as typified by impact resistance.

Glass is widely used as containers for seasonings, oil, juice, carbonated beverage, beer, wine, cosmetics, and detergents. Since glass containers are relatively expensive to manufacture, recycling is recommended to recover empty containers for reuse. Glass containers require a more cost for transportation because of heavy weight and suffer from the drawbacks that they are breakable and need careful handling.

Plastic containers which are free of the above-mentioned drawbacks appeared as a substitute for glass containers. Recent conversion from glass to plastic containers takes place very rapidly. The material of which containers are made is selected from a variety of plastic materials depending on the type of filling contents and the intended application. Among various plastic materials, polyethylene terephthalate is utilized as the stock material for molding containers for juice, refreshments, carbonated beverage, seasonings, detergent, and cosmetics because of heat resistance, transparency, and gas barrier. Among these applications, molded hollow containers which are to be filled with juice, refreshments and carbonated beverage are required to come up with a high speed filling process. A heat-resistant resin composition which withstands high-temperature filling is required because concurrent sterilization is desired. These molded hollow containers must be transparent so that the filling is visible from the outside. Although polyethylene terephthalate is a plastic material which is excellent in the necessary physical properties, a transparent polyethylene terephthalate having a sufficient heat resistance to comply with the above-mentioned high-temperature filling has never been available.

Several methods are known in the prior art for molding heat-resistant hollow containers from polyethylene terephthalate, including lamination of a heat-resistant resin such as polyarylate (see Plastics, Vol. 36, No. 9, 121 (1985)), molding followed by heat setting (see Japanese Patent Publication No. 59-3301, Japanese Patent Application Kokai No. 55-12031, 56-75833 and 56-13142), and treatment of molded containers with a solvent to improve crystallinity (see Japanese Patent Publication No. 59-15807). These methods impart heat resistance to the polyethylene terephthalate material which has poor heat resistance by nature by using special molding means or by applying a treatment after molding. Neither of the molded hollow containers produced by these methods were fully transparent or satisfactorily resistant to the heat applied during high-temperature filling of juice. In the field of application of molded hollow polyethylene terephthalate containers where high-temperature filling is required, there is a strong need for a hollow container-molding material which has a sufficient heat resistance and mechanical properties to comply with high-temperature filling, while maintaining the transparency of polyethylene terephthalate per se.

SUMMARY OF THE INVENTION

Therefore, one object of the present invention is to provide a resin composition comprising a polyester and a polycarbonate which has improved mechanical properties including impact resistance and stress crack resistance as well as excellent transparency and heat resistance and exhibits a high melt flow upon molding.

The inventors have found that this object can be attained by a polyester composition comprising a specific polyalkylene terephthalate and a specific polycarbonate.

According to a first aspect of the present invention, there is provided a polyester composition comprising (A) 20 to 80% by weight of a polyalkylene terephthalate comprising ethylene terephthalate as a main unit and having an intrinsic viscosity $[\eta]$ in the range of from 0.6 to 1.2 dl/g as measured in o-chlorophenol at 25° C., and (B) 20 to 80% by weight of a polycarbonate comprising bisphenol-A as a diol component and having an intrinsic viscosity $[\eta]$ in the range of from 0.6 to 1.2 dl/g as measured in o-chlorophenol at 25° C., the composition having an intrinsic viscosity $[\eta]$ in the range of from 0.6 to 1.2 dl/g as measured in o-chlorophenol at 25° C. and a single glass transition temperature [Tg] in the range of from 80° to 130° C.

Another object of the present invention is to provide a molded polyester laminate which has improved heat resistance and transparency as well as improved mechanical properties such as impact resistance and which is suitable as a stock material for use in applications to mold hollow laminate preforms and hollow laminate articles.

The inventors have found that this object can be attained by a molded polyester laminate comprising a layer of polyalkylene terephthalate and another layer of a specific polyester composition comprising polyalkylene terephthalate and polycarbonate.

The molded polyester laminate of the present invention has improved heat resistance and transparency as well as improved mechanical properties such as impact resistance and is suitable as a stock material for use in applications to produce hollow laminate preforms and molded hollow laminate articles. Particularly, a molded hollow polyester laminate container fabricated from the molded hollow polyester laminate of the present invention has compatibility with both high-temperature and highspeed filling processes in addition to the above-mentioned characteristics.

According to a second aspect of the present invention, there is provided a molded polyester laminate comprising:

(I) a layer of a polyester composition comprising
(A) 20 to 80% by weight of a polyalkylene terephthalate comprising ethylene terephthalate as a main unit and having an intrinsic viscosity $[\eta]$ in the range of from 0.6 to 1.2 dl/g as measured in o-chlorophenol at 25° C., and
(B) 20 to 80% by weight of a polycarbonate comprising bisphenol-A as a diol component and having an intrinsic viscosity $[\eta]$ in the range of from 0.6 to 1.2 dl/g as measured in o-chlorophenol at 25° C.,
the composition having an intrinsic viscosity $[\eta]$ in the range of from 0.6 to 1.2 dl/g as measured in o-chlorophenol at 25° C. and a single glass transition temperature [Tg] in the range of from 80° to 130° C., and
(II) a layer of a polyalkylene terephthalate comprising ethylene terephthalate as a main unit.

According to a third aspect of the present invention, there is provided a stretched molded polyester laminate of the same construction as above.

A multilayer hollow preform comprising the molded polyester laminate and a multilayer hollow article comprising the molded polyester laminate are also contemplated in the present invention.

DETAILED DESCRIPTION OF THE INVENTION

The polyalkylene terephthalate (A) which is one essential component of the polyester composition of the present invention is a polyester comprising ethylene terephthalate as a main unit. The polyalkylene terephthalate generally contains at least 50 mol %, preferably at least 70 mol % of ethylene terephthalate units. The polyalkylene terephthalate consisting of dicarboxylic acid and diol units contains terephthalic acid as the dicarboxylic acid units. It may contain a minor proportion of another aromatic dicarboxylic acid unit in addition to the terephthalic acid units. Examples of the other aromatic dicarboxylic acid units include isophthalic acid, phthalic acid, and naphthalene dicarboxylic acid. The polyalkylene terephthalate contains ethylene glycol as the diol units. It may contain a minor proportion of another diol unit in addition to the ethylene glycol units. Examples of the other diol units include diols having 3 to 15 carbon atoms, for example, 1,3-propanediol, 1,4-butanediol, neopentyl glycol, cyclohexanediol, cyclohexane dimethanol, 1,4-bis($\beta$-hydroxyethoxy)benzene, 1,3-bis(8-hydroxyethoxy)benzene, 2,2-bis(4-$\beta$-hydroxyethoxyphenyl)propane, and bis(4-$\beta$-hydroxyethoxyphenyl)sulfone.

In addition to the aromatic dicarboxylic acid units and diol units mentioned above, the polyalkylene terephthalate may contain a minor proportion of a polyfunctional compound if desired. Examples of the polyfunctional compound include aromatic polybasic acids such as trimellitic acid, trimesic acid, and 3,3',5,5'-tetracarboxydiphenyl; aliphatic polybasic acids such as butanetetracarboxylic acid; aromatic polyols such as phlorogulcin and 1,2,4,5-tetrahydroxybenzene; aliphatic polyols such as glycerine, trimethylol ethane, trimethylol propane, and pentaerythritol; and hydroxypolycarboxylic acids such as tartaric acid and malic acid.

The polyalkylene terephthalate contains the above-mentioned units in the following proportion. The content of terephthalic acid units generally ranges from 50 to 100 mol %, preferably from 70 to 100 mol %. The content of aromatic dicarboxylic acid units other than the terephthalic acid units generally ranges from 0 to 50 mol %, preferably from 0 to 30 mol %. The content of ethylene glycol units generally ranges from 50 to 100 mol %, preferably from 70 to 100 mol %. The content of diol units other than the ethylene glycol units generally ranges from 0 to 50 mol %, preferably from 0 to 30 mol %. The content of polyfunctional compound units generally ranges from 0 to 2 mol %, preferably from 0 to 1 mol %.

The polyalkylene terephthalate may be prepared by any of the known methods, including direct polycondensation from an aromatic dicarboxylic acid predominantly comprising terephthalic acid and a diol predominantly comprising ethylene glycol, and transesterification between an aromatic dicarboxylic acid diester predominantly comprising a terephthalic acid diester such as dimethyl terephthalate and a diol predominantly comprising ethylene glycol. The direct polycondensation is preferred because the resulting polyalkylene terephthalate has improved color hue and transparency. The polycondensation may be carried out in the presence of a catalyst which is selected from antimony compounds, titanium compounds, germanium compounds and other catalysts commonly used in polycondensation reaction. The preferred catalysts are germanium compounds such as germanium oxide and tetraalkoxy germanium because the resulting polyalkylene terephthalate and a polyester composition thereof with a polycarbonate exhibit improved color hue and transparency.

The polyalkylene terephthalate has an intrinsic viscosity $[\eta]$ in the range of from 0.6 to 1.2 dl/g, preferably from 0.65 to 1.15 dl/g, most preferably from 0.7 to 1.1 dl/g as measured in o-chlorophenol at 25° C. A polyester composition containing a polyalkylene terephthalate with an intrinsic viscosity of less than 0.6 dl/g is low in mechanical strength such as impact resistance. With a polyalkylene terephthalate having an intrinsic viscosity of higher than 1.2 dl/g, a more milling power is required to prepare a polyester composition because the increased melt viscosity of the composition, leading to an economic disadvantage.

The polyalkylene terephthalate generally has a melting point in the range of from 220° to 260° C., preferably from 230° to 260° C. as measured by a differential scanning calorimeter (DSC). The polyalkylene terephthalate generally has a glass transition temperature [Tg] in the range of from 50° to 80° C., preferably from 55° to 78° C., most preferably from 60° to 75° C. as measured by DSC.

The polycarbonate (B), the other essential component of the polyester composition of the present invention is a polycarbonate comprising bisphenol-A or 2,2-bis(4-hydroxyphenyl)propane as its diol component. The polycarbonate may be prepared by the polycondensation of bisphenol-A with phosgene or a carbonate diester. The polycarbonate has an intrinsic viscosity $[\eta]$ in the range of from 0.6 to 1.2 dl/g, preferably from 0.65 to 1.15 dl/g, most preferably from 0.7 to 1.1 dl/g as measured in o-chlorophenol at 25° C. A polyester composition containing a polycarbonate with an intrinsic viscosity of less than 0.6 dl/g has a too low molecular weight to insure mechanical strength such as impact resistance and stress crack resistance. With a polycarbonate having an intrinsic viscosity of higher than 1.2 dl/g, a more milling power is required to prepare a polyester composition because the increased melt viscosity of the composition, leading to an economic disadvantage. The polycarbonate generally has a glass transition temperature [Tg] in the range of from 140° to 150° C. as measured by DSC.

The polyester composition of the present invention contains from 20 to 80% by weight, preferably 20 to 70% by weight, more preferably from 20 to 60% by weight of the above-defined polyalkylene terephthalate (A) and from 20 to 80% by weight, preferably 30 to 80% by weight, more preferably from 40 to 80% by weight of the above-defined polycarbonate (B), based on the combined weight of components (A) and (B) of 100% by weight. If more than 80% by weight of polyalkylene terephthalate (A) and less than 20% by weight of polycarbonate (B) are blended, the resulting polyester composition has a glass transition temperature [Tg] approximate to that of the polyalkylene terephthalate and suffers from a loss of heat resistance and mechanical strength such as impact resistance. If less than 20% by weight of polyalkylene terephthalate (A) and more than 80% by weight of polycarbonate (B) are blended, the resulting polyester composition has a lower melt flow and poor chemical resistance and stress crack resistance. A low melt flow is inconvenient in molding a laminated article from the polyester composition.

The polyester composition of the present invention has an intrinsic viscosity $[\eta]$ in the range of from 0.6 to 1.2 dl/g, preferably from 0.65 to 1.15 dl/g, more preferably from 0.7 to 1.1 dl/g as measured in o-chlorophenol at 25° C. A polyester composition having an intrinsic viscosity of less than 0.6 dl/g is poor in mechanical strengths including impact resistance and stress crack resistance. A laminated article molded from such a polyester composition cannot well retain its shape at elevated temperatures. With an intrinsic viscosity in excess of 1.2 dl/g, the polyester composition shows a poor melt flow and becomes difficult to mold.

The polyester composition of the present invention has a single glass transition temperature [Tg] in the range of from 80° to 130° C., preferably from 85° to 125° C., more preferably from 90° to 120° C. as measured by DSC. If the glass transition temperature [Tg] of a polyester composition is lower than 80° C., there is no substantial difference in Tg between the polyester composition and the polyalkylene terephthalate constituting the composition, which means that the heat resistance of the composition is lowered. If the glass transition temperature [Tg] of a polyester composition is higher than 130° C., there is no substantial difference in Tg between the polyester composition and the bisphenol-A polycarbonate constituting the composition, which means that the chemical resistance and stress crack resistance of the composition are lowered and the composition can be molded into a laminated part with difficulty. When the glass transition temperature [Tg] of a polyester composition falls within the above-defined range as measured by DSC, but has more than single transition, the composition, and hence a laminated part molded therefrom, becomes opaque.

The polyester composition of the present invention may be molded into a plate which generally has a haze of up to 25%, preferably up to 20%, and more preferably up to 15% at a thickness of 2 mm.

The polyester composition of the present invention may be prepared by the following exemplary, but non-limiting process.

A polyalkylene terephthalate stock is dried in an atmosphere of dry air, dry nitrogen or vacuum, for example, at about 140° C. for about 15 hours or more before use. Also a bisphenol-A polycarbonate stock is dried in an atmosphere of dry air, dry nitrogen or vacuum, for example, at about 120° C. for about 15 hours or more before use. The dry polyalkylene terephthalate and bisphenol-A polycarbonate are mixed in a proportion desired for a final polyester composition, and milled in molten state at a temperature in the range of from about 240° to about 320° C., preferably from 250° to 310° C., most preferably from 260° to 300° C. in a single screw extruder, twin screw extruder, Brabender plasto-graph (trade name) or another mill having an equivalent milling capacity. Insofar as the time taken for milling is not extended as long as 1 hour, the melt milling results in a composition which is opaque as disclosed in the publications described above and its glass transition temperature [Tg] as measured by DSC has double transitions, one transition being close to the transition of polyalkylene terephthalate and the other close to the transition of bisphenol-A polycarbonate.

The melt milled composition, if it has absorbed moisture because of contact with water or placement in the ambient atmosphere, is then dried in an atmosphere of dry air, dry nitrogen or vacuum, for example, at a temperature of from about 80° to about 100° C. for about 15 hours or more. A reaction vessel, which is equipped with an agitator and can be evacuated to vacuum, is then charged with the composition. The composition is agitated and milled in a molten state until it becomes transparent. The milling temperature generally ranges from about 240° to about 320° C., preferably from 250° to 310° C., more preferably from 260° to 300° C.

The composition may be turned into a transparent one by milling in an inert gas atmosphere such as nitrogen although the preferred milling atmosphere is vacuum. As milling in vacuum turns the composition into transparent one, polycondensation reaction also proceeds to increase the molecular weight of the composition. The resulting composition has improved mechanical strength such as impact resistance as well as stress crack resistance. For vacuum milling, a vacuum of about 0.1 mmHg to about 300 mmHg, more preferably from about 1 mmHg to about 200 mmHg is appropriate and the milling time generally ranges from about ½ to about 15 hours, preferably from about 1 to about 10 hours. When the viscosity of the system increases as the degree of polymerization increases with a lapse of milling time, the milling temperature may most preferably be gradually increased within the above-defined range during the milling operation. The thus obtained transparent composition is recovered in a conventional manner as by withdrawing in the form of strands from the reaction vessel under pressure and cutting the strands.

In addition to the polyalkylene terephthalate (A) and bisphenol-A polycarbonate (B), the polyester composition of the present invention may contain appropriate amounts of any other well-known additives if desired, for example, nucleating agents, inorganic fillers, lubricants, anti-slip agents, anti-blocking agent, stabilizers, antistatic agents, anti-fogging agents, and pigments.

According to the second aspect of the present invention, there is provided a molded polyester laminate comprising (I) a layer of a polyester composition and (II) a layer of a polyalkylene terephthalate. Since the polyester composition of layer (I) is the same as described above, layer (II) will be described in detail.

The polyalkylene terephthalate of which polyalkylene terephthalate layer (II) is formed is a polyester comprising ethylene terephthalate as a main unit. The polyalkylene terephthalate generally contains at least 50 mol %, preferably at least 70 mol % of ethylene terephthalate units. The polyalkylene terephthalate consisting of dicarboxylic acid and diol units contains terephthalic acid as the dicarboxylic acid units. It may contain a minor proportion of another aromatic dicarboxylic acid unit in addition to the terephthalic acid units. Examples of the other aromatic dicarboxylic acid units include isophthalic acid, phthalic acid, and naphthalene dicarboxylic acid. The polyalkylene terephthalate contains ethylene glycol as the diol units. It may contain a minor proportion of another diol unit in addition to the ethylene glycol units. Examples of the other diol units include diols having 3 to 15 carbon atoms, for example, 1,3-propanediol, 1,4-butanediol, neopentyl glycol, cyclohexanediol, cyclohexane dimethanol, 1,4-bis($\beta$-hydroxyethoxy)benzene, 1,3-bis(8-hydroxyethoxy)benzene, 2,2-bis(4-$\beta$-hydroxyethoxyphenyl)propane, and bis(4-$\beta$-hydroxyethoxyphenyl)sulfone.

In addition to the aromatic dicarboxylic acid units and diol units mentioned above, the polyalkylene terephthalate may contain a minor proportion of a polyfunctional compound if desired. Examples of the polyfunctional compound include aromatic polybasic acids such as trimellitic acid, trimesic acid, and 3,3',5,5'-tetracarboxydiphenyl; aliphatic polybasic acids such as butanetetracarboxylic acid; aromatic polyols such as phloroglucin and 1,2,4,5-tetrahydroxybenzene; aliphatic polyols such as glycerine, trimethylol ethane, trimethylol propane, and pentaerythritol; and hydroxypolycarboxylic acids such as tartaric acid and malic acid.

The polyalkylene terephthalate contains the above-mentioned units in the following proportion. The content of terephthalic acid units generally ranges from 50 to 100 mol %, preferably from 70 to 100 mol %. The content of aromatic dicarboxylic acid units other than the terephthalic acid units generally ranges from 0 to 50 mol %, preferably from 0 to 30 mol %. The content of ethylene glycol units generally ranges from 50 to 100 mol %, preferably from 70 to 100 mol %. The content of diol units other than the ethylene glycol units generally ranges from 0 to 50 mol %, preferably from 0 to 30 mol %. The content of polyfunctional compound units generally ranges from 0 to 2 mol %, preferably from 0 to 1 mol %.

The polyalkylene terephthalate has an intrinsic viscosity [$\eta$] in the range of from 0.5 to 1.5 dl/g, preferably from 0.6 to 1.2 dl/g as measured in o-chlorophenol at 25° C. Its melting point generally ranges from 210° to 265° C., preferably from 220° to 260° C. as measured by DSC. Its glass transition temperature generally ranges from 50° to 120° C., preferably from 60° to 100° C. as measured by DSC.

The polyalkylene terephthalate which forms layer (II) of the molded polyester laminate of the present invention need not necessarily be the same as polyalkylene terephthalate (A) of the polyester composition of layer (I). The polyalkylene terephthalate of layer (II) may also contain appropriate amounts of any additives commonly added to conventional polyester compositions if desired, for example, nucleating agents, inorganic fillers, lubricants, anti-blocking agents, and pigments.

The molded laminates of the present invention comprising the polyester composition layer (I) and the ethylene terephthalate-based polyalkylene terephthalate layer (II) include various structures, for example, (a) a molded two-layer laminate consisting of a polyester composition layer and a polyalkylene terephthalate layer, (b) a molded three-layer laminate consisting of a polyester composition intermediate layer and two polyalkylene terephthalate outer layers, (c) a molded three-layer laminate consisting of a polyalkylene terephthalate intermediate layer and two polyester composition outer layers, (d) a molded multilayer laminate having a structure of four or more layers wherein layers of polyester composition and polyalkylene terephthalate are laminated, with both the outermost layers being polyalkylene terephthalate layers, (e) a molded multilayer laminate having a structure of four or more layers wherein layers of polyester composition and polyalkylene terephthalate are alternately laminated, with both the outermost layers being polyester composition layers, and (f) a molded multilayer laminate having a structure of four or more layers wherein layers of polyester composition and polyalkylene terephthalate are alternately laminated, with the outermost layers being polyester composition and polyalkylene terephthalate layers. The molded laminate may be applied not only to sheets, plates, and tubes, but also to various hollow bodies, containers, and other structures of any desired shape. The molded laminate may be manufactured by any well-known prior art method.

The thickness of the polyester composition and polyalkylene terephthalate layers of the molded laminate is not particularly limited and is appropriately determined depending on the intended use of the molded laminate. In the case of a molded two-layer laminate (a), the thickness of the polyester composition layer may generally range from 4 to 350 $\mu$m, preferably from 6 to 200 $\mu$m, and the thickness of the polyalkylene terephthalate layer may generally range from 8 to 600 $\mu$m, preferably from 10 to 500 $\mu$m. In the case of a molded three-layer laminate (b), the polyester composition intermediate layer may generally have a thickness in the range of from 4 to 350 $\mu$m, preferably from 6 to 200 $\mu$m, and the polyalkylene terephthalate outer layers may generally have a thickness in the range of from 4 to 300 $\mu$m, preferably from 5 to 250 $\mu$m. In the case of a molded three-layer laminate (c), the polyalkylene terephthalate intermediate layer may generally have a thickness in the range of from 8 to 600 $\mu$m, preferably from 10 to 500 $\mu$m, and the polyester composition outer layers may generally have a thickness in the range of from 4 to 100 $\mu$m, preferably from 6 to 50 $\mu$m. In the case of molded multilayer laminates having four or more layers, the thickness of the intermediate and outermost layers of polyester composition and the thickness of the intermediate and outermost layers of polyalkylene terephthalate may be similarly selected.

The molded laminate is highly transparent and heat resistant and has improved mechanical properties such as impact resistance so that it may find a variety of applications.

According to the third aspect of the present invention, there is provided a stretched molded polyester laminate comprising (I) a layer of a polyester composition and (II) a layer of a polyalkylene terephthalate predominantly comprising ethylene terephthalate. The stretched polyester laminate is a molded polyester article having a laminate structure comprising the polyester composition layer and the polyalkylene terephthalate layer, wherein at least one polyalkylene terephthalate layer is stretched or oriented. The laminate structure includes the same types as previously mentioned. Preferred is a molded polyester article comprising the polyester composition layer (I) and the polyalkylene terephthalate layer (II) and having a laminate structure as mentioned above, wherein at least all the polyalkylene terephthalate layers are stretched. Most preferred is a molded polyester article comprising the polyester composition layer (I) and the polyalkylene terephthalate layer (II) and having a laminate structure as mentioned above, wherein all the polyester composition layers and the polyalkylene terephthalate layers are stretched. The stretched or oriented layer may be either a monoaxially oriented layer or a biaxially oriented layer. The stretched molded polyester laminate may take any desired form including films and sheets.

Where the resin layer of the stretched polyester laminate is monoaxially oriented, the degree of stretching or draw ratio may generally be in the range of from 1.1 to 10 times, preferably from 1.2 to 8 times, most preferably from 1.5 to 7 times the original length. Where the resin layer is biaxially oriented, the degree of stretching may generally be in the range of from 1.1 to 8 times, preferably from 1.2 to 7 times, most preferably from 1.5 to 6 times the original length in a longitudinal direction and in the range of from 1.1 to 8 times, preferably from 1.2 to 7 times, most preferably from 1.5 to 6 times the original length in a transverse direction. The stretched laminate may be heat set if desired.

The stretched polyester laminate in the form of a film or sheet may be manufactured by any well-known prior art method.

In general, the polyester composition and the polyalkylene terephthalate are separately melted in individual extruders, and then extruded through a multilayer T-die by a melt coextrusion technique into a multilayer laminated intermediate in the form of a film or sheet. The multilayer laminated intermediate as extruded is subjected to stretching, or once cooled and solidified at a temperature lower than the glass transition temperature, then reheated, and subjected to stretching. Another available method is by preforming the polyalkylene terephthalate into a film or sheet, and extrusion or sandwich laminating the polyester composition to the preformed film or sheet. In the extrusion or sandwich lamination method, the preformed film or sheet of polyalkylene terephthalate may be either monoaxially or biaxially stretched prior to or subsequent to lamination. Among these stretching methods, the first coextrusion method of molding a multilayer laminated intermediate followed by stretching is preferred because the steps are simple and a stretched polyester laminate characterized by the firm adhesion between its layers is obtained.

The stretching method applicable to a molded laminate intermediate in the manufacture of a stretched polyester laminate includes a variety of techniques when the molded laminate intermediate is in the form of a film or sheet. For example, there are available a monoaxial orientation technique wherein a molded laminate intermediate is stretched in a single direction, a biaxial orientation technique wherein a multilayer laminated intermediate is stretched in a longitudinal direction and then in a transverse direction, another biaxial orientation technique wherein a laminated intermediate is stretched simultaneously in longitudinal and transverse directions, a technique wherein biaxial stretching is followed by at least one stretching in either direction, a technique wherein biaxial stretching is followed by further biaxial stretching, and a vacuum forming technique wherein vacuum is applied to the space between the laminated intermediate and the mold. The temperature at which stretching is carried out is at least the glass transition temperature or melting point of the resins of which the molded laminate intermediate is made, preferably in the range between the glass transition temperature and a temperature higher than the glass transition temperature by 80° C. The stretched polyester laminate may be heat set by heating at the stretching temperature or higher temperature for a short, but appropriate time.

The stretched molded laminate of the present invention has excellent heat resistance and transparency as well as improved mechanical properties including impact resistance, and thus finds a wide variety of applications. Particularly when the stretched molding in the form of a film is used as a coating for electric and electronic parts and products or metals, the coating maintains for an extended period of time its effect of protecting electric and electronic circuits or preventing corrosion of metals. The stretched laminate film is useful in electric and electronic applications for coating capacitors, motors, transformers, and conductors. The stretched laminate film is also useful in general applications such as food wrapping purposes. The molded and stretched laminate of the present invention may be used not only in the form of a film, but also in the form of a container for the purposes of storing foods, medicines, agricultural agents or the like by taking advantage of its excellent heat resistance and chemical resistance.

The stretched hollow polyester preform of the present invention according to the fourth aspect of the present invention is a hollow preform having a multilayer laminated structure comprising (I) a layer of a polyester composition and (II) a layer of a polyalkylene terephthalate predominantly comprising ethylene terephthalate. The multilayer laminated structure includes the same types as previously described. The preforms having a laminated structure include a two-layer laminated preform, a three-layer laminated preform, and multilayer laminated preforms having four or more layers as previously described in conjunction with the molded laminate of the present invention. Among these multilayer hollow preforms, a preform having a two-layer laminate structure consisting of a polyester composition layer (I) and a polyalkylene terephthalate layer (II), and a preform having a three-layer laminate structure consisting of a polyester composition intermediate layer (I) and two polyalkylene terephthalate outer layers (II) are preferred because a stretch molded multilayer hollow article can be obtained therefrom having improved mechanical strength as well as excellent transparency and heat resistance.

Either of the polyester composition of layer (I) and the polyalkylene terephthalate of layer (II) constituting the multilayer hollow preform according to the present invention may contain appropriate amounts of any commonly used additives if desired, for example, nucleating agents, inorganic fillers, lubricants, anti-slipping agents, anti-blocking agents, stabilizers, antistatic agents, antifogging agents, and pigments.

The polyester multilayer hollow preform of the present invention may be fabricated by any well-known prior art method. For example, it may be obtained by forming and processing a tubular molding having a laminate structure as previously mentioned.

The stretch molded multilayer hollow polyester article according to the fifth aspect of the present invention is a stretch molded multilayer hollow article comprising (I) a layer of a polyester composition and (II) a layer of a polyalkylene terephthalate predominantly comprising ethylene terephthalate. This article may be fabricated by blow stretching the multilayer hollow preform just described above. The stretch molded multilayer hollow polyester articles include a stretched hollow article having a two layer structure consisting of a polyester composition layer and a polyalkylene terephthalate layer, a stretched hollow article having a three layer structure consisting of alternately laminated polyester composition and polyalkylene terephthalate layers, and a stretched hollow multilayer article having a four or more layer structure consisting of alternately laminated polyester composition and polyalkylene terephthalate layers.

In the case of a two-layer hollow article, there are contemplated a stretched two-layer hollow molded article wherein the polyester composition layer is an external layer and the polyalkylene terephthalate layer is an internal layer, and a stretched two-layer hollow molded article wherein the polyester composition layer is an internal layer and the polyalkylene terephthalate layer is an external layer. In the case of a three-layer hollow article, there are contemplated a stretched three-layer hollow molded article wherein the polyester composition layer is an intermediate layer and the polyalkylene terephthalate layers are internal and external layers, and a stretched three-layer hollow molded article wherein the polyester composition layers are internal and external layers and the polyalkylene terephthalate layer is an intermediate layer. In the case of a stretched multilayer hollow molded article having four or more layers, either a polyester composition layer or a polyalkylene terephthalate layer may be an internal layer. Among the polyester multilayer hollow articles, preferred is a stretched multilayer hollow article wherein the internal layer is a polyalkylene terephthalate layer. Most preferred is a stretched three-layer hollow article wherein the intermediate layer is a polyester composition layer and the internal and external layers are polyalkylene terephthalate layers.

The stretched multilayer hollow molded articles may be either monoaxially or biaxially stretched articles although biaxially stretched articles are generally preferred because of mechanical strength and heat resistance. The stretching degree applicable to the stretched multilayer hollow molded articles is the same as previously described in conjunction with the stretched laminate.

The stretched multilayer hollow polyester molded articles are fabricated by the stretching blow molding of the polyester multilayer hollow preform described above. For example, the preform may be stretched in a longitudinal direction at a stretching temperature as previously mentioned and then stretched in a transverse direction by blow molding (biaxial stretching blow molding).

The stretched multilayer hollow polyester molded articles of the present invention may be used in a variety of applications because of their excellent transparency and heat resistance as well as improved mechanical properties including impact resistance. Particularly, biaxially stretched multilayer hollow containers have the additional advantage of being fully compatible with high-temperature and high-speed filling processes so that they are useful as containers for seasonings, oil, preserves, syrup, wine, juice, refreshments, cosmetics, and detergents. When they are used as containers for foods such as preserves and syrup, it is possible to carry out sterilization at elevated temperatures at the same time as filling, to eventually extend the edible life.

EXAMPLE

Examples of the present invention are given below by way of illustration and not by way of limitation.

Examples 1–10 illustrate the preparation of polyester compositions and Examples 11–19 illustrate the use of the polyester compositions. All parts and percents in the examples and comparative examples are by weight unless otherwise stated.

It is to be noted that the intrinsic viscosity $[\eta]$ of a polyester composition was measured as a solution thereof in o-chlorophenol at 25° C. The glass transition temperature [Tg] of a polyester composition was measured by a differential scanning calorimeter (DSC) in accordance with ASTM D3418 while setting both the temperature elevating and descending rates to 10° C./min. As the glass transition temperature [Tg] Tf temperature was adopted.

The thermal properties and mechanical strength of a polyester composition and a laminate molded therefrom were measured by the standard measuring methods as prescribed in JIS K 6719, and K 6911.

The transparency of a polyester composition and a laminate molded therefrom was measured by a hazemeter model NDH-20D manufactured by Nihon Denshoku Kogyo K.K.

EXAMPLE 1

A polyethylene terephthalate (Mitsui Pet J 135, manufactured and sold by Mitsui PET Resin Co.,Ltd.) was dried in an atmosphere of dry air at 140° C. for 14 hours and a polycarbonate (Panlite K 1250, manufactured and sold by Teijin Chemicals Co.,Ltd.) was dried in an atmosphere of dry air at 130° C. for 15 hours. A blend was prepared by mixing 50 parts of the dry polyethylene terephthalate and 50 parts of the dry polycarbonate both in pellet form, milling the mixture in a single screw extruder at a temperature of 250° to 270° C., and comminuting the extrudate into pellets. The blend in pellet form was placed in a reaction vessel which was equipped with an agitator and a condenser for condensing a fraction distilled off during operation under vacuum. The blend was melted by heating at 270° to 290° C. in a nitrogen atmosphere with agitation. With agitation, the system was evacuated from the atmospheric pressure to a vacuum of about 10 mmHg over a period of about 1 hour (first treating period). Agitation was continued at 270° to 290° C. in a vacuum of about 10 mmHg for an additional period of about 5 hours (second treating period). As the operation proceeded, the transparency of the contents was increased and the viscosity thereof was gradually increased. At the end of the heat treatment, the system was restored to the atmospheric pressure with nitrogen. The treated composition was recovered by drawing the composition in the form of strands under pressure of nitrogen and cutting the strands into pellets. The resulting polyester composition was transparent and had an intrinsic viscosity [η] of 0.77 dl/g and a glass transition temperature [Tg] of 98° C. The pellet polyester composition was press molded at about 270° C. into specimens to be tested for physical properties. The composition had a heat distortion temperature of 91° C., a flexural strength of 1120 kg/cm$^2$, a flexural modulus of 29,000 kg/cm$^2$, a notched Izod impact strength of 11.5 kg-cm/cm at 23° C., and a haze of 7.4%.

COMPARATIVE EXAMPLE 1

The blend obtained in pellet form in Example 1 after milling in a single screw extruder and comminuting the extrudate was measured for glass transition temperature to find two, one transition at 76° C. close to the glass transition temperature of the polyethylene terephthalate and the other at 143° C. close to the glass transition temperature of the polycarbonate. The blend was press molded into a specimen which was measured to have a haze of 76%, indicating a lower transparency.

EXAMPLES 2-6

Transparent compositions were prepared by repeating the procedure of Example 1 except that the amounts of the polyethylene terephthalate and the polycarbonate used and the second treating period were changed as shown in Table 1. More particularly, when the blend obtained from a single screw extruder was melt agitated in a reaction vessel, the system was evacuated from the atmospheric pressure to a vacuum of about 10 mmHg over a period of about 1 hour, and then held at a vacuum of about 10 mmHg at a temperature of from 270° to 290° C. for the second treating period which was varied as shown in Table 1. The intrinsic viscosity (IV) and glass transition temperature (Tg) of the resulting polyester compositions are shown in Table 1 along with the heat distortion temperature (HDT), mechanical strengths and haze of a specimen press molded therefrom.

TABLE 1

|  | Examples | | | | |
|---|---|---|---|---|---|
|  | 2 | 3 | 4 | 5 | 6 |
| Amount of polyethylene terephthalate used, parts | 70 parts | 60 | 40 | 30 | 25 |
| Amount of polycarbonate used, parts | 30 | 40 | 60 | 70 | 75 |
| Second treating period, hour | 4.0 | 4.5 | 9.0 | 9.5 | 11.0 |
| IV, dl/g | 0.75 | 0.78 | 0.79 | 0.77 | 0.75 |
| Tg, °C. | 84 | 92 | 106 | 115 | 120 |
| HDT, °C. | 76 | 83 | 99 | 103 | 109 |
| Mechanical Strength | | | | | |
| Flexural strength, kg/cm$^2$ | 1180 | 1140 | 1070 | 990 | 970 |
| Flexural modulus, kg/cm$^2$ | 30800 | 29600 | 28400 | 27900 | 27500 |
| Izod impact (notched, 23° C.), kg-cm/cm | 8.3 | 10.8 | 14.0 | 17.3 | 18.0 |
| Haze, % | 5.6 | 6.4 | 7.5 | 9.8 | 12.0 |

COMPARATIVE EXAMPLE 2

A transparent polyester composition was prepared by repeating the procedure of Example 1 except that the amounts of the polyethylene terephthalate and the polycarbonate used were changed to 90 and 10 parts, respectively, and the second treating time during which the composition was held at a temperature of 280° to 290° C. in a vacuum of about 10 mmHg was 4.0 hours. The resulting polyester composition had an intrinsic viscosity [η] of 0.77 dl/g. The glass transition temperature [Tg] of the composition was observed to have a single transition at a temperature of 78° C., which did not substantially differ from the glass transition temperature of the polyethylene terephthlate.

EXAMPLES 7-10

Transparent polyester compositions were prepared by repeating the procedure of Example 1 except that the polyethylene terephthalate was replaced by those reported in Table 2, the polycarbonate was replaced by those reported in Table 2, the amounts of the polyethylene terephthalate and the polycarbonate used were changed to 40 parts and 60 parts, respectively, and the temperature and time of the second treating period were changed as shown in Table 2. The resulting polyester compositions were measured for various properties in the same manner as in Example 1. The intrinsic viscosity (IV) and lass transition temperature (Tg) of the compositions are shown in Table 2 along with the heat distortion temperature (HDT), mechanical strengths and haze of a specimen press molded therefrom.

TABLE 2

| | Examples | | | |
|---|---|---|---|---|
| | 7 | 8 | 9 | 10 |
| Polyethylene terephthalate[1] | PET J055 | | PET J025 | |
| Polycarbonate[2] | Panlite K-1250 | Panlite K-1300 | Panlite K-1300 | Lexane 101 |
| Second treating period | | | | |
| Temperature, °C. | 280–290 | 285–295 | 280–290 | 275–285 |
| Time, hour | 9.0 | 9.0 | 8.5 | 8.0 |
| IV, dl/g | 0.84 | 1.01 | 0.80 | 0.71 |
| Tg, °C. | 106 | 107 | 105 | 104 |
| HDT, °C. | 99 | 100 | 99 | 96 |
| Mechanical Strength | | | | |
| Flexural strength, kg/cm$^2$ | 1100 | 1130 | 1070 | 1010 |
| Flexural modulus, kg/cm$^2$ | 28200 | 28000 | 28500 | 28400 |
| Izod impact (notched, 23° C., kg-cm/cm | 15.3 | 17.0 | 13.9 | 12.1 |
| Haze, % | 7.5 | 7.3 | 7.8 | 7.4 |

[1]Mitsu PET J055 and J025 both manufactured and sold by Mitsui PET Resin Co., Ltd.
[2]Panlite K-1250 and K-1300 both manufactured and sold by Teijin Chemicals Co., Ltd.
Lexane 101 manufactured and sold by Engineering Plastics Co., Ltd.

EXAMPLE 11

A dry polyethylene terephthalate (Mitsui PET J125, manufactured and sold by Mitsui PET Resin Co.,Ltd.) was melted in an extruder. The polyester composition prepared in Example 4 was melted in another extruder. These two molten materials were supplied to a two-type/three-layer T-die to coextrude a sheet of polyethylene terephthalate/polyester composition/polyethylene terephthalate structure (thickness about 30μm/40μm/30μm). The coextrded sheet was transparent and a firm adhesion was observed between the polyethylene terephthalate layers and the polyester composition layer.

Using a biaxial stretching machine, the coextruded multilayer sheet was sequentially stretched at a temperature of about 100° to 115° C. first in a transverse direction (perpendicular to flow direction) by a factor of two, and then in a longitudinal direction (flow direction) by a factor of three to yield a biaxially stretched film consisting of three layers of two types and having an average thickness of about 17 μm. The adhesion between the polyethylene terephthalate layers and the polyester composition layer of the biaxially stretched film was firm. In the stretched film, the polyester composition layer was about 6 μm thick and the polyethylene terephthalate layers each were about 5 μm thick. The biaxially stretched laminated film had the following mechanical properties: a tensile strength of 1250 kg/cm$^2$ in the flow direction or 1180 kg/cm$^2$ in a direction perpendicular to the flow direction, an elongation of 60% in the flow direction or 44% in a direction perpendicular to the flow direction, and a tensile modulus of 37,000kg/cm$^2$ in the flow direction or 33,000 kg/cm$^2$ in a direction perpendicular to the flow direction. The stretched film was immersed in hot water at about 95° C. to find no deformation.

EXAMPLE 12

The polyester composition of Example 1 was compression molded by a press molding machine at about 260° C. and 50 kg/cm$^2$ into a pressed sheet of about 100 μm thick. Also, a dry polyethylene terephthalate which was the same as in Example 1 was compression molded by a press molding machine at about 270° C. and 50 kg/cm$^2$ into a pressed sheet of about 100 μm thick. These sheets were placed one on another such that the polyester composition sheet was sandwiched between the polyethylene terephthalate sheets. The assembly was pressed at about 260° C. and 50 kg/cm$^2$ into a two type/three layer pressed sheet consisting of polyethylene terephthalate/polyester composition/polyethylene terephthalate having a thickness of about 200 μm. The three layer pressed sheet was transparent and a firm adhesion was observed between the polyester composition layer and the polyethylene terephthalate layer.

The three layer pressed sheet was then biaxially costretched at a temperature of about 100° C. into a biaxially stretched film having an average thickness of 22 μm. The film was transparent and the polyester composition layer was about 8 μm thick and the polyethylene terephthalate layers each were about 7 μm thick. The adhesion between the polyethylene terephthalate layers and the polyester composition layer of the biaxially stretched film was firm. The biaxially stretched laminated film had the following mechanical properties: a tensile strength of 1230 kg/cm$^2$, an elongation of 45%, and a tensile modulus of 35,000 kg/cm$^2$. The stretched film was immersed in hot water at about 90° C. to find no deformation.

COMPARATIVE EXAMPLE 3

A dry polyethylene terephthalate which was the same as in Example 11 was pressed into a pressed sheet of about 100 μm thick.

The pressed sheet was biaxially costretched as in Example 12, but by a factor of three both in longitudinal and transverse directions. There was obtained a biaxially stretched film of about 11 μm thick. The biaxially stretched film had the following mechanical properties: a tensile strength of 1530 kg/cm$^2$, an elongation of 50%, and a tensile modulus of 46,000 kg/cm$^2$. The stretched film was immersed in hot water at about 80° C. to find some shrinkage.

EXAMPLES 13–17

Two type/three layer laminated pressed sheets of about 200 μm thick were prepared by repeating the procedure of Example 12 except that the polyethylene terephthalate and polyester composition used in Example 12 were replaced by the materials reported in Table 3. All the sheets were transparent and the adhesion between the polyethylene terephthalate layers and the polyester composition layer was firm.

The laminated pressed sheets were biaxially costretched as in Example 12, but by a factor of three both in longitudinal and transverse directions at the temperature reported in Table 3. All the resulting biaxially stretched films were transparent and had an average thickness of about 22 μm. The films were observed to be uniformly stretched. The adhesion between the polyethylene terephthalate layers and the polyester composition layer of the biaxially stretched film was firm. The stretched films were immersed in hot water. The temperature of hot water was about 80° C. for the films of Examples 13 and 14 and about 95° C. for the films of Examples 15, 16, and 17. No change in shape of the films was observed. The biaxially stretched laminated films were measured for mechanical strengths, with the results shown in Table 3.

TABLE 3

| | Examples | | | | |
|---|---|---|---|---|---|
| | 13 | 14 | 15 | 16 | 17 |
| Polyethylene terephthalate* | J125 | J125 | J135 | J135 | J025 |
| Polyester composition | Ex.2 | Ex.3 | Ex.5 | Ex.8 | Ex.10 |
| Stretching temp., °C. | 90 | 95 | 115 | 108 | 105 |
| Mechanical properties of biaxially stretched films | | | | | |
| Tensile strength, kg/cm$^2$ | 1500 | 1420 | 1280 | 1300 | 1280 |
| Elongation, % | 55 | 52 | 60 | 53 | 48 |
| Tensile modulus, kg/cm$^2$ | 44000 | 40000 | 32000 | 37000 | 34000 |

*Mitsui PET J125, J135 and J025 all manufactured and sold by Mitsui PET Resin Co. Ltd.

EXAMPLE 18

A polyethylene terephthalate which was the same as in Example 11 was first injection was molded and the polyester composition of Example 4 was then injection molded to produce a preform consisting of a polyethylene terephthalate layer and a polyester composition layer each having a thickness of about 1.6 mm. The preform was heated at a temperature of 100° to 115° C. by far-infrared radiation heating means and then biaxially stretched by means of a stretching blow molding machine by a factor of 2.5 in a longitudinal direction and by a factor of 4.3 in a transverse direction, thereby obtaining a stretch molded bottle having an interior volume of about 1 liter wherein the polyethylene terephthalate and polyester composition layers each had a minimum wall thickness of about 150 μm. The stretched bottle was transparent and experienced no deformation when filled with hot water at about 90° C.

COMPARATIVE EXAMPLE 4

A polyethylene terephthalate which was the same as used in Example 18 was injection molded to form a preform consisting solely of a polyethylene terephthalate layer having the same thickness (about 3.2 mm) as the preform of Example 18. The preform was stretch blown at about 95° C. in the same manner as in Example 18 to obtain a stretched bottle having an interior volume of about 1 liter and a minimum wall thickness of about 300 μm. When hot water at about 90° C. was poured into the stretched bottle, the bottle underwent substantial shrinkage and deformation, losing the original shape.

EXAMPLE 19

A polyethylene terephthalate which was the same as used in Example 11 was melted in an extruder. Separately, the polyester composition of Example 4 was melted in another extruder. The molten materials were fed to a two type/three layer pipe die to extrude a three layer pipe consisting of polyethylene terephthalate/polyester composition/polyethylene terephthalate layers (thickness about 1.2 mm/1.2 mm/1.2 mm), which was cooled with water to obtain a three layer pipe having an outer diameter of 24.8 mm and a wall thickness of 3.6 mm. A preform was produced by cutting a section out of the pipe, heat sealing one end of the section to form a closed bottom, and similarly heat forming the other end to form an open plug joint. The preform had an entire length of 16.5 cm and a weight of about 50 grams.

The preform was biaxially stretched by a biaxial stretching blow molding machine, model LB01 manufactured by CORPOPLAST Co. by a factor of 2.5 in a longitudinal direction and by a factor of 4 in a transverse direction. There was obtained a multilayered container having an interior volume of 1.5 liters and consisting of polyethylene terephthalate/polyester composition/polyethylene terephthalate layers (thickness about 120 μm/120 μm/120 μm). Hot water at about 90° C. was poured into the container to find no deformation. The container was filled with water at 0° C. before a drop test was carried out. The container was not broken when it was dropped from a height of 1 meter. No delamination of the layers was observed.

Although some preferred examples of the present invention are illustrated, modifications and changes may be made thereon without departing from the scope of the claims of the present invention.

We claim:
1. A molded polyester laminate comprising
   (I) a layer of a polyester composition comprising
      (A) 20 to 80% by weight of a polyalkylene terephthalate comprising ethylene terephthalate as a main unit and having an intrinsic viscosity [η] in the range of from 0.6 to 1.2 dl/g as measured in o-chlorophenol at 25° C., and
      (B) 20 to 80% by weight of a polycarbonate comprising bisphenol-A as a diol component and having an intrinsic viscosity [η] in the range of from 0.6 to 1.2 dl/g as measured in o-chlorophenol at 25° C.,
   said composition having an intrinsic viscosity [η] in the range of from 0.6 to 1.2 dl/g as measured in o-chlorophenol at 25° C. and a single glass transition temperature [Tg] in the range of from 80° to 130° C., and
   (II) a layer of a polyalkylene terephthalate comprising ethylene terephthalate as a main unit.
2. A stretched molded polyester laminate comprising
   (I) a layer of a polyester composition comprising
      (A) 20 to 80% by weight of a polyalkylene terephthalate comprising ethylene terephthalate as a main unit and having an intrinsic viscosity [η] in the range of from 0.6 to 1.2 dl/g as measured in o-chlorophenol at 25° C., and
      (B) 20 to 80% by weight of a polycarbonate comprising bisphenol-A as a diol component and having an intrinsic viscosity [η] in the range of from 0.6 to 1.2 dl/g as measured in o-chlorophenol at 25° C.,
   said composition having an intrinsic viscosity [η] in the range of from 0.6 to 1.2 dl/g as measured in o-chlorophenol at 25° C. and a single glass transition temperature [Tg] in the range of from 80° to 130° C., and
   (II) a layer of a polyalkylene terephthalate comprising ethylene terephthalate as a main unit.
3. A multilayer hollow preform, comprising the molded polyester laminate of claim 1.
4. A multilayer hollow article comprising the molded polyester laminate of claim 2.

* * * * *